Oct. 20, 1959 C. BERKLEY 2,909,599

VIDEO DISPLAY DEVICE

Filed March 16, 1953

INVENTOR.
CARL BERKLEY

BY Darby & Darby
ATTORNEYS 2,909,599

VIDEO DISPLAY DEVICE

Carl Berkley, Great Notch, N.J., assignor to Allen B. Du Mont Laboratories, Inc., Clifton, N.J., a corporation of Delaware Application March 16, 1953, Serial No. 342,519

20 Claims. (Cl. 178—6.8)

This invention relates to a novel form of display device or picture reproducing screen for use with television receivers or other video systems.

An object of this invention is to provide a screen for the production and display of television pictures.

Another object is to provide a screen which is compact and limited in depth or thickness so as to make it possible to hang the screen on a wall in a manner similar to that of a picture or to incorporate it in a small, compact, portable television receiver.

These and other objects will become apparent from the specification and the drawing in which.

Existing television receivers use as a picture reproducing device a cathode ray tube, on the fluorescent screen of which the picture is caused to appear. Such tubes are bulky, especially when they provide large screens. In addition they require the use of high and dangerous voltages for accelerating and focusing the electron beam. Since the electron beam must operate in a vacuum, the forces external to the envelope cause tremendous pressure to be exerted thereon, with resultant danger of implosion. To provide safety to the viewer, it is customary to provide a sheet of safety glass in front of the screen of the tube, further adding to the bulk and complexity of the receiver.

My invention contemplates the use of electro-luminescent material in which a plurality of fine conductors arranged in pairs are embedded. (The properties of such electro-luminescent material are described in part in the "Sylvania Technologist, vol. 4, No. 1, pp. 1–5.") The conductors constitute transmission lines with a prescribed rate of propagation over which may be passed a narrow voltage pulse. These pulses may be derived from and controlled by synchronizing signals such as presently used in television practice.

As each voltage pulse passes along each line, the electro-luminescent material is caused to emit light in the vicinity of the pulse because of the properties described above. The visual effect therefore is the same as that of the moving cathode ray tube spot as presently used. By placing the lines at a slight angle with respect to the edge of the supporting member and parallel to each other as shown in Figure 1, a raster may be formed as now used in television.

If the characteristic impedance of the line is correct a pulse of voltage may be passed along each line at a uniform rate. This rate may be adjusted by changing the mechanical dimensions or materials. By continuing each line across the back of the screen to the beginning of the next line as shown, the screen may be completely scanned by the voltage pulse, and the resultant spot of light will then move over the entire area of the screen. The disposition of the conductors may be as shown as in Figure 1, or any other configuration suitable for the scanning pattern used.

The light output from the screen may then be modulated by placing a light valve or an electro-optical filter in front of the screen and actuating it by a video signal similar to that presently used to modulate the electron beam in a cathode ray tube.

Figures 1, 2:
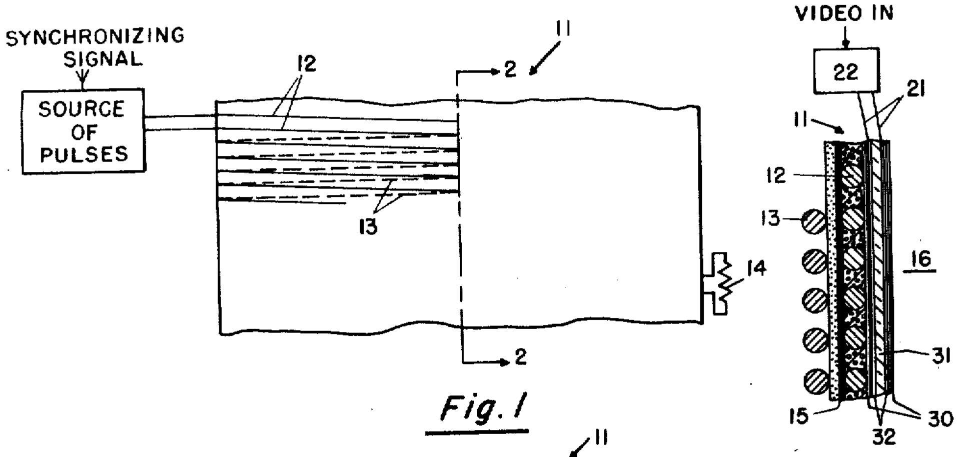
Figure 1 shows one embodiment of the screen of my invention.
Figure 2 is a cross-sectional view, taken along the line 2—2 of Figure 1.

Referring now to Figure 1, there is portrayed a front view of the screen 11 showing the individual conductors of the transmission line 12, and, in dotted form, the return conductors 13 across the back. The end of the line is terminated in a resistor 14 to prevent reflections.

As shown in Figure 2, a light reflecting coating 15 is placed on the back of the screen and a light valve 16 placed in front of the screen. This light valve may, for example, be a sandwich made up of two sheets 30 of a polarizing material such as is known commercially as "Polaroid," between which is placed a suitably cut crystal 31, or a plurality of crystals juxtaposed in a regular array, of a material such as potassium dihydrogen phosphate, capable of polarizing light when placed in a strong electrostatic field, this crystal having a transparent conductive coating 32 on each face to which are connected leads 21 from a source of potential 22 to vary the polarization in accordance with a video signal.

The sheets 30 are so positioned that their planes of polarization are at right angles to each other. Application of a potential difference between the two conductive coatings 32 causes a rotation of the plane of polarization of light passing through the crystal 31 and because of the 90° relationship between the polarizing sheets 30, the greater the potential impressed across the crystal, the greater the light from the moving luminescent spot which is transmitted through the light valve to the observer. By connecting a source of vertical pulses to the line 12, and the video signal to the source of potential 22, the light produced by the pulse travelling along the line is modulated so as to produce a television picture.

Using the above described pairs of parallel conductors, the velocity of travel of the pulse will in general be higher than desired and the pulse will spend half of its time on the reverse side of the supporting member 11. If another picture is desired on the back of the screen, the return conductors may also be embedded in luminescent material. It will be understood, of course, that in such a case the transmission standards would have to be drastically changed.

Figure 3:
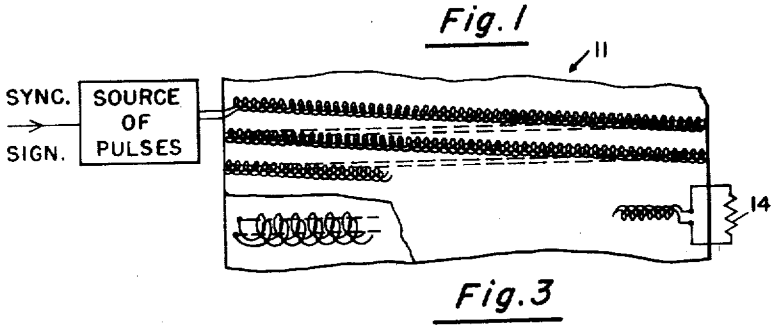
Figure 3 is a second embodiment of my invention.

In general, it is desirable to have the picture appear on only one side, and to make the spot move relatively slowly across the face with a rapid return across the back. To accomplish this, the lines across the face may be made in the form of delay lines while those in the rear are straight or open wire lines. By winding the conductors 12 of Figure 1, in continuous helices, as shown in Figure 3, this may be accomplished.

Figures 4, 5:
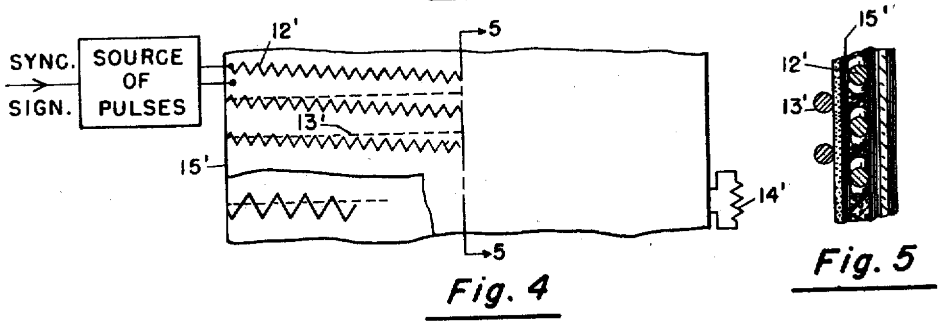
Figure 4 is another embodiment thereof.
Figure 5 is a cross-sectional view, taken along the line 5—5 of Figure 4.

Another way in which the above delay may be accomplished is shown in Figures 4 and 5, in which the light reflecting coating 15' is conductive and is connected to one lead from the source of pulses. Instead of the pairs of fine wires wound into a coil as described above, this embodiment employs a single fine wire 12' which may be shaped into a zigzag configuration and so placed with respect to the conductive coating 15' as to form a transmission line with a predetermined velocity of propagation.

The propagation velocity in this, as in the former embodiments, may be adjusted by varying the electrical and mechanical parameters, which parameters may also be varied gradually to compensate for losses along the line. The zigzag configuration has a tendency to extend the length of the line so as to make the time of transmission of the pulse across the face of the screen longer than the time of transmission of the pulse across the rear of the screen. As before the fine wire is embedded in electro-luminescent material, and the terminating resistor 14' is connected between the end of the zigzag line and the conductive coating 15'. A return conductor 13' is again provided across the back of the screen to connect individual portions of the light producing zigzag lines.

Figure 6:
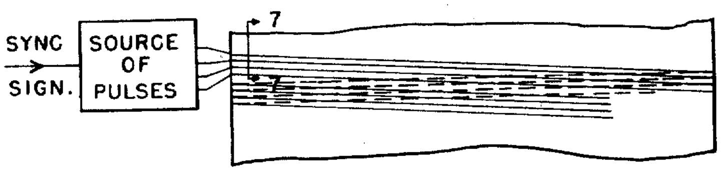
Figure 6 shows a further embodiment of the invention suitable for reproducing color television.
Figure 7:
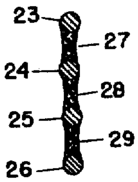
Figure 7 is a cross-sectional view taken along the lines 7—7 of Figure 6.

Figures 6 and 7 show still another embodiment which may be used to reproduce color television. In this embodiment the transmission lines may be composed of a plurality of conductors 23, 24, 25 and 26, connected in pairs as transmission lines 23—24, 24—25, 25—26, between which are placed strips of electro-luminescent material 27, 28 and 29 which luminesce in the appropriate color when excited by the pulses passing along the lines. These conductors derive pulses from appropriate sources, synchronized by color synchronizing signals as presently proposed for color television.

While I have illustrated and described several specific embodiments of my invention it will be apparent that many modifications may be made and I wish therefore not to be limited by the foregoing description, but on the contrary only by claims granted to me.

What is claimed is:

1. In a video display device, in combination, a sheet of electroluminescent material, a plurality of coiled transmission lines spaced side by side extending across said sheet and embedded therein, means connecting said lines serially, said means being spaced from said sheet, a source of pulses connected to said lines to energize said luminescent material in a scanning pattern, a light valve positioned between said sheet and an observer, and means for modulating said light valve to produce a picture from said scanning pattern.

2. The device of claim 1 characterized in that a layer of material opaque to light is placed on the side of said sheet remote from said observer and said connecting means extends across the rear of said layer.

3. The device of claim 1 characterized in that a layer of light reflecting material is placed on the side of said sheet remote from said observer and said connecting means extends across the rear of said layer.

4. The device of claim 1 characterized in that said transmission lines incorporate pulse delaying means therein and said connecting means comprise non-delaying conductors.

5. The device of claim 1 characterized in that said transmission lines incorporate pulse delaying means so formed that the amount of delay varies from the beginning of said serially connected transmission lines to the end thereof and said connecting means comprise non-delaying conductors.

6. In a video display device, in combination, a sheet of electroluminescent material, a plurality of transmission lines spaced side by side, each transmission line comprising at least one conductor extending across said sheet and embedded therein, means connecting said lines serially, said means being spaced from said sheet, a source of pulses connected to said lines to energize said luminescent material in a scanning pattern, a light valve positioned between said sheet and an observer and means for modulating said light valve to produce a picture from said scanning pattern.

7. The device of claim 6 characterized in that a layer of material opaque to light is placed on the side of said sheet remote from said observer and said connecting means extends across the rear of said layer.

8. The device of claim 7 characterized in that said layer of material opaque to light comprises a layer of light reflecting material.

9. The device of claim 6 characterized in that said transmission lines incorporate pulse delaying means therein and said connecting means comprise non-delaying conductors.

10. The device of claim 6 characterized in that said transmission lines incorporate pulse delaying means for varying the delay from the beginning of said serially connected transmission lines to the end thereof and said connecting means comprise non-delaying conductors.

11. The device of claim 6, in which the spacing of said transmission lines is varied along the length of the line to compensate for losses in transmission.

12. The device of claim 6, in which said transmission lines are connected serially one to the other by means of conductors positioned behind said device.

13. The device of claim 6, including a light reflecting surface positioned in a plane adjacent and parallel to the plane of said electro-luminescent material.

14. In a video display device, a sheet of electro-luminescent material, a conductive light reflecting layer on one side thereof, a plurality of conductors spaced side by side within said sheet and spaced from said layer to provide a transmission line in combination with said layer, a source of pulses connected between said conductors and said layer, and a light valve positioned adjacent thereto.

15. The device of claim 14, in which the spacing between said conductors and said layer is varied along the length of said conductors to compensate for losses in transmission.

16. The device of claim 14, in which said conductors are formed in a zigzag configuration in a plane parallel to that of said layer and spaced therefrom to provide a transmission line with a specific transmission time.

17. The device of claim 14, in which said conductors are connected serially one to the other by means of other conductors.

18. In a video display device for color, a plurality of transmission lines spaced side by side and embedded in separate strips of electro-luminescent material, each strip being capable of emanating different color light when excited, a source of pulses connected to said transmission lines, and a light valve positioned adjacent thereto.

19. The device of claim 4 characterized in that the pulse delaying means comprises forming said transmission lines of helically coiled conductors.

20. The device of claim 4 characterized in that said pulse delaying means comprises forming said transmission lines of zigzag conductors.

References Cited in the file of this patent

UNITED STATES PATENTS

| | | |
|---|---|---|
| 1,884,593 | Davis | Oct. 25, 1932 |
| 2,013,559 | Gordon | Sept. 3, 1935 |
| 2,072,455 | Kannenberg | Mar. 2, 1937 |
| 2,077,030 | Birch-Field | Apr. 13, 1937 |
| 2,201,066 | Toulon | May 14, 1940 |
| 2,595,617 | Toulon | May 6, 1952 |